(12) United States Patent
Tadysak

(10) Patent No.: US 9,932,008 B1
(45) Date of Patent: Apr. 3, 2018

(54) INTEGRATED BUMPER SPACERS FOR VEHICLE WITH SUSPENSION MODIFICATIONS

(71) Applicant: Stacy Jordan Tadysak, Naples, FL (US)

(72) Inventor: Stacy Jordan Tadysak, Naples, FL (US)

( * ) Notice: Subject to any disclaimer, the term of this patent is extended or adjusted under 35 U.S.C. 154(b) by 38 days.

(21) Appl. No.: 15/295,148

(22) Filed: Oct. 17, 2016

Related U.S. Application Data

(60) Provisional application No. 62/243,217, filed on Oct. 19, 2015.

(51) Int. Cl.
  *B60R 19/38*  (2006.01)
  *B60R 19/24*  (2006.01)
  *B60R 19/03*  (2006.01)

(52) U.S. Cl.
  CPC .............. *B60R 19/38* (2013.01); *B60R 19/03* (2013.01); *B60R 19/24* (2013.01)

(58) Field of Classification Search
  CPC ........ B60R 19/023; B60R 19/24; B60R 19/38
  USPC .................................................. 293/132, 155
  See application file for complete search history.

(56) References Cited

U.S. PATENT DOCUMENTS

| | | | | |
|---|---|---|---|---|
| 4,597,603 | A * | 7/1986 | Trabert | B60K 11/08 293/115 |
| 7,004,519 | B2 * | 2/2006 | Roussel | B60R 19/18 293/120 |
| 7,303,219 | B2 * | 12/2007 | Trabant | B60R 19/24 293/120 |
| 2008/0309102 | A1 * | 12/2008 | Sampaio | B60R 19/18 293/132 |
| 2015/0291113 | A1 * | 10/2015 | Farrington | B60R 19/24 29/897.2 |

* cited by examiner

*Primary Examiner* — Jason S Daniels
(74) *Attorney, Agent, or Firm* — Harpman & Harpman

(57) ABSTRACT

A system of bumper spacers that provide for relocation of a vehicle's bumper forward of the body. Single and multiple points of attachment define spacers are provided with varying dimensional aspects to accommodate different vehicle applications. Stabilization and positioning installation engagement tab extensions extend from the respective spacers in both the axial and trans-axial opening alignment extending at right angles from the spacer's body member exterior surface.

6 Claims, 4 Drawing Sheets

INTEGRATED BUMPER SPACERS FOR VEHICLE WITH SUSPENSION MODIFICATIONS

This application claims the benefit of U.S. Provisional Application No. 62/243,217, filed Oct. 19, 2015

BACKGROUND OF THE INVENTION

1. Technical Field

This invention relates to material vehicle bumpers, specifically trucks, in which the bumpers attach to the vehicle frame by a plurality of attachment brackets and bolts.

2. Description of Prior Art

Prior art bumper spacers are typically of a single attachment point construction and are used to space the vehicle's bumper in relation to its mounting support points on the vehicle's body. Such bumper repositioning is required when the vehicle's suspension has been modified (lifted) to increase ground clearance and to accommodate larger wheels and tires than were provided by the manufacturer. Such prior art bumper spacer kits provide the required longer mounting bolts, washers and nuts with spacers for different manufacturers in which wheel clearance is needed after the suspension modification.

SUMMARY OF THE INVENTION

A bumper spacer system having multiple bumper spacer configurations to accommodate different manufacturer's vehicle bumpers. Multiple bumper spacer assemblies having multiple independent bolt attachment bores to match a wide variety of bumper attachment bolt configurations. Positioning and holding exterior tabs extend from single and dual bolt bumper spacers allowing stabilization and positioning holding of the spacers in bolt alignment simplifying installation given a limited accessibility of spacers frequently incurred.

DETAILED DESCRIPTION OF THE INVENTION

Figure 1:
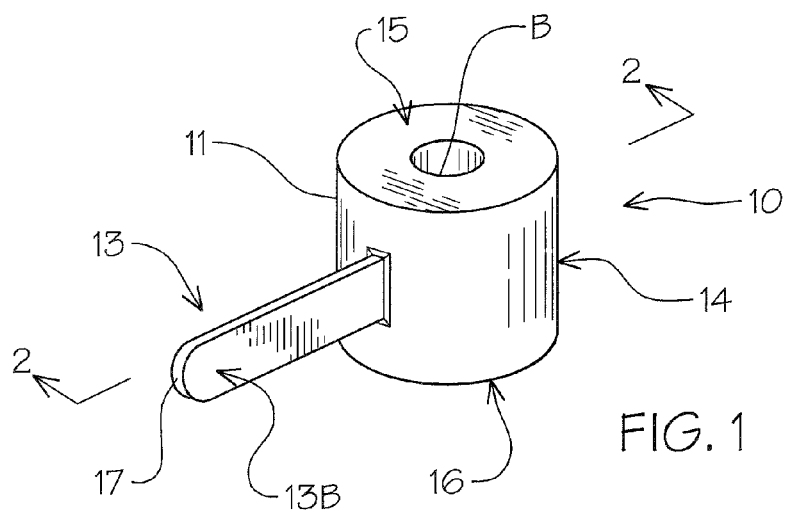
FIG. 1 is a perspective view of a bumper spacer of the invention with a positioning tab extending therefrom.
Figure 2:
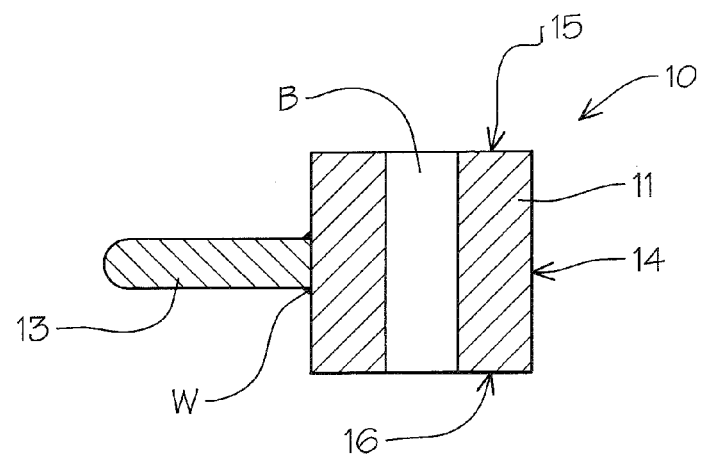
FIG. 2 is a cross-sectional view on lines 2-2 of FIG. 1.
Figure 3:
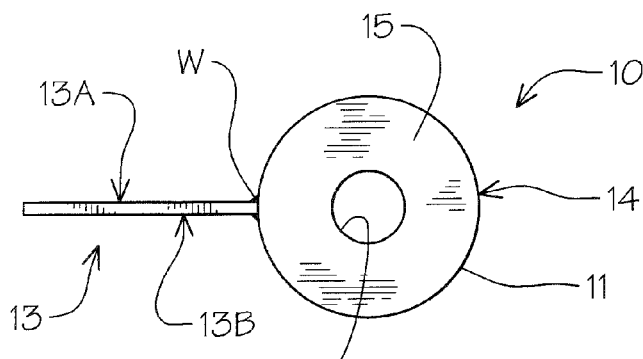
FIG. 3 is a top plan view thereof.

Referring to FIGS. 1-3 of the drawings, a primary form of the invention can be seen as a bumper spacer 10 having a main cylindrical body member 11 with a central bolt receiving bore B extending longitudinally there through. A positioning and engagement tab 13 extends at a right angle from an annular exterior side surface 14 in equally spaced relation from the cylinder bodies 11, top 15 and bottom surface 16. The positioning engagement tab 13 is of an elongated flat opposing side surfaces 13A and 13B with a curved terminal end 17. The positioning and engagement tab 13 is secured to the annular side surface 14 by welding W or other suitable attachment methodology known within the art.

The cylinder body 11 is of a solid monolithic mask preferably of metal having a known density and strength for its intended use as a bumper spacer.

Figure 4:
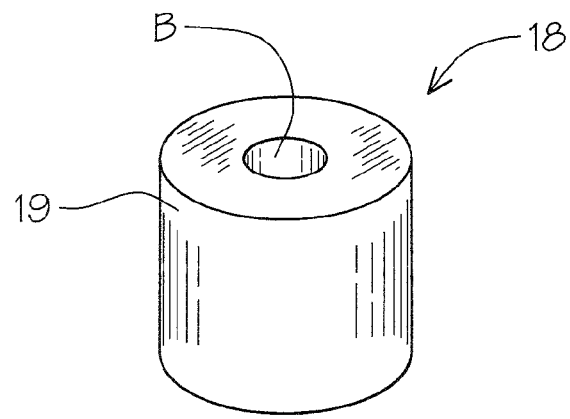
FIG. 4 is a perspective view of an alternate bumper spacer as seen in FIG. 1 of the drawings.
Figure 5:
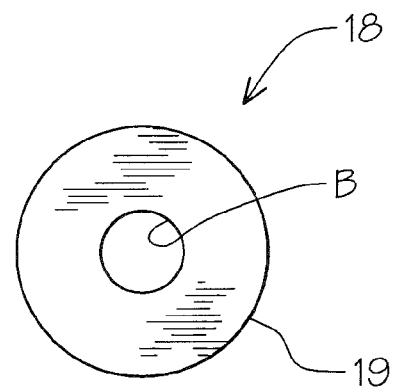
FIG. 5 is a top plan view thereof.

Referring now to FIGS. 4 and 5 of the drawings, an alternate bumper spacer 18 of the invention can be seen having a cylindrical body member 19 with a central bore B extending longitudinally there through for receiving a bumper mounting bolt and attachment nut assembly, not shown.

Figure 6:
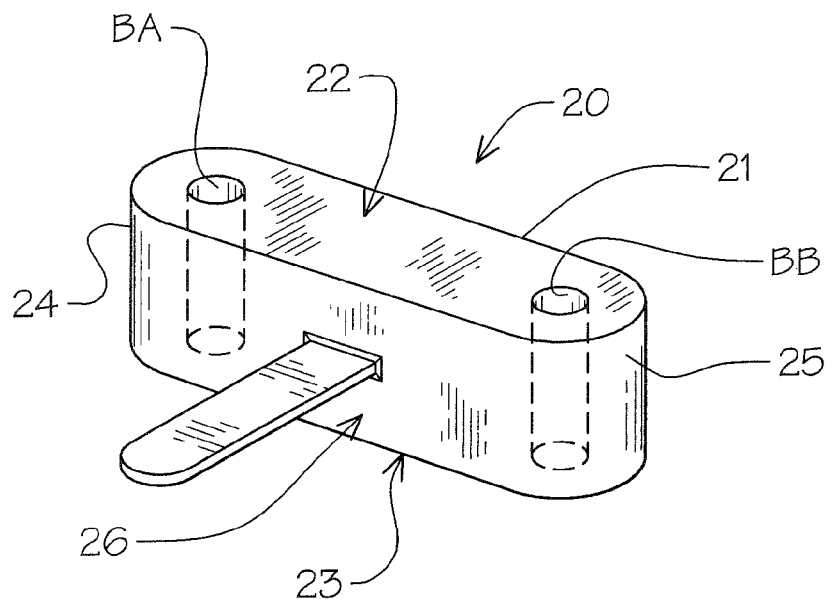
FIG. 6 is a perspective view of an alternate dual bolt position tab bumper spacer.
Figure 7:
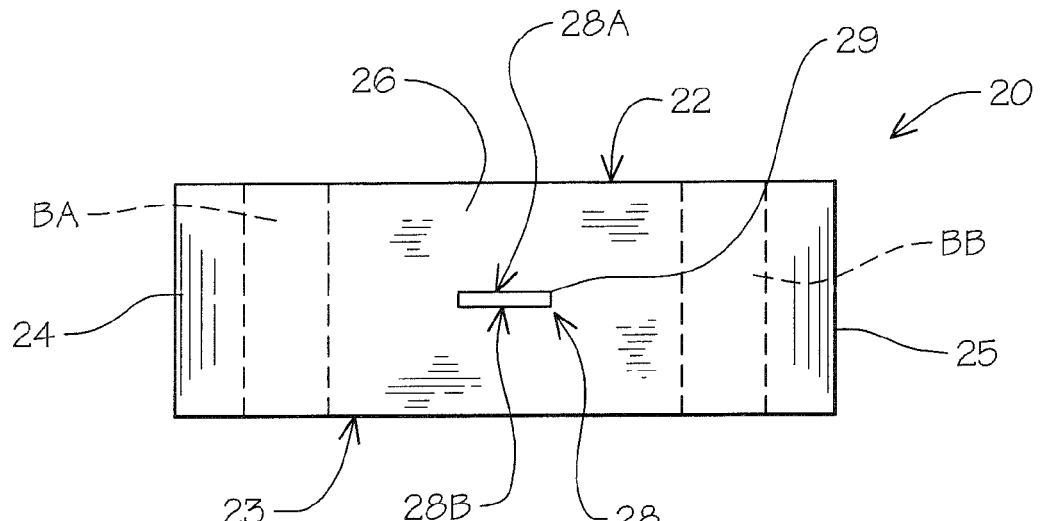
FIG. 7 is a front elevational view thereof.
Figure 8:
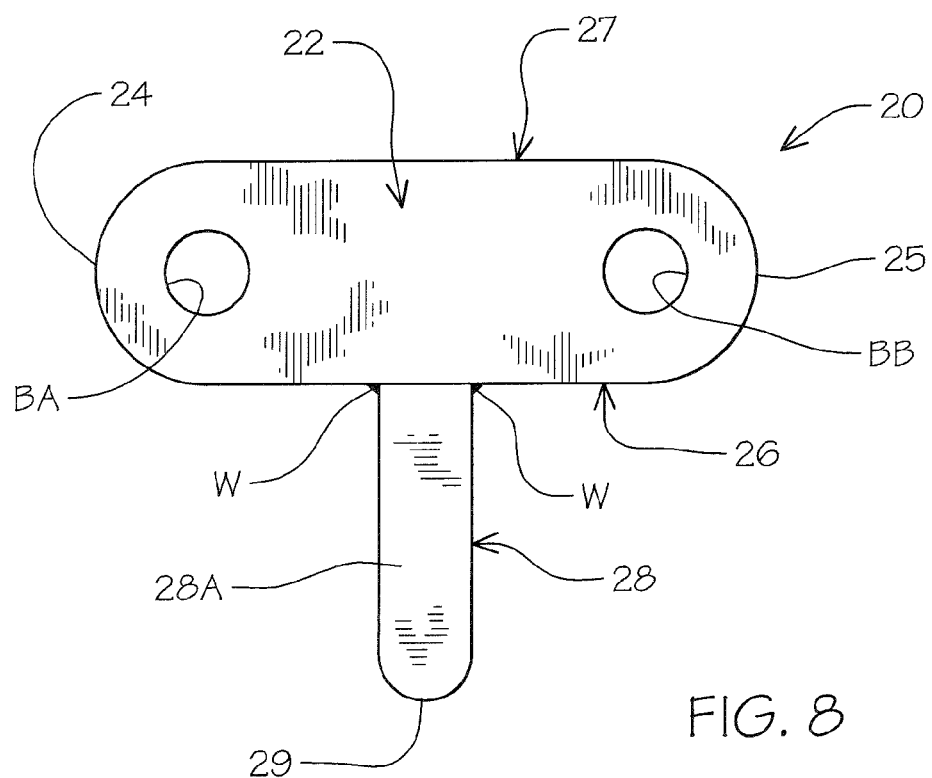
FIG. 8 is a top plan view thereof

Referring now to FIGS. 6, 7 and 8 of the drawings, a dual bolt spacer assembly 20 of the primary form of the invention can be seen having a rectangular body member 21 with oppositely disposed spaced parallel flat upper and lower surfaces 22 and 23. The body member 21 has opposing curved ends 24 and 25 with corresponding interconnecting front and rear exterior side surfaces 26 and 27.

A pair of bolt receiving bores BA and BB extend through the body member's opposing upper and lower surfaces 22 and 23 with each of the bores being spaced inwardly of their respective curved ends 24 and 25. The dual bores BA and BB are therefore in spaced parallel aligned orientation to one another.

A positioning tab 28 extends from the front side surface 26. The tab 28 has a top surface 28A and a bottom surface 28B with a terminal end 29. The tab 28 is secured to the side surface 26 by welding W in this example.

Figure 9:
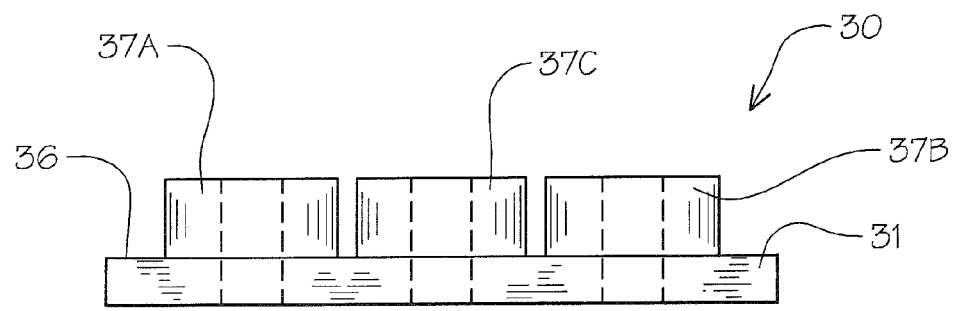
FIG. 9 is a front elevational view of an alternate multiple mounting bolt attachment bumper spacer configuration.
Figure 10:
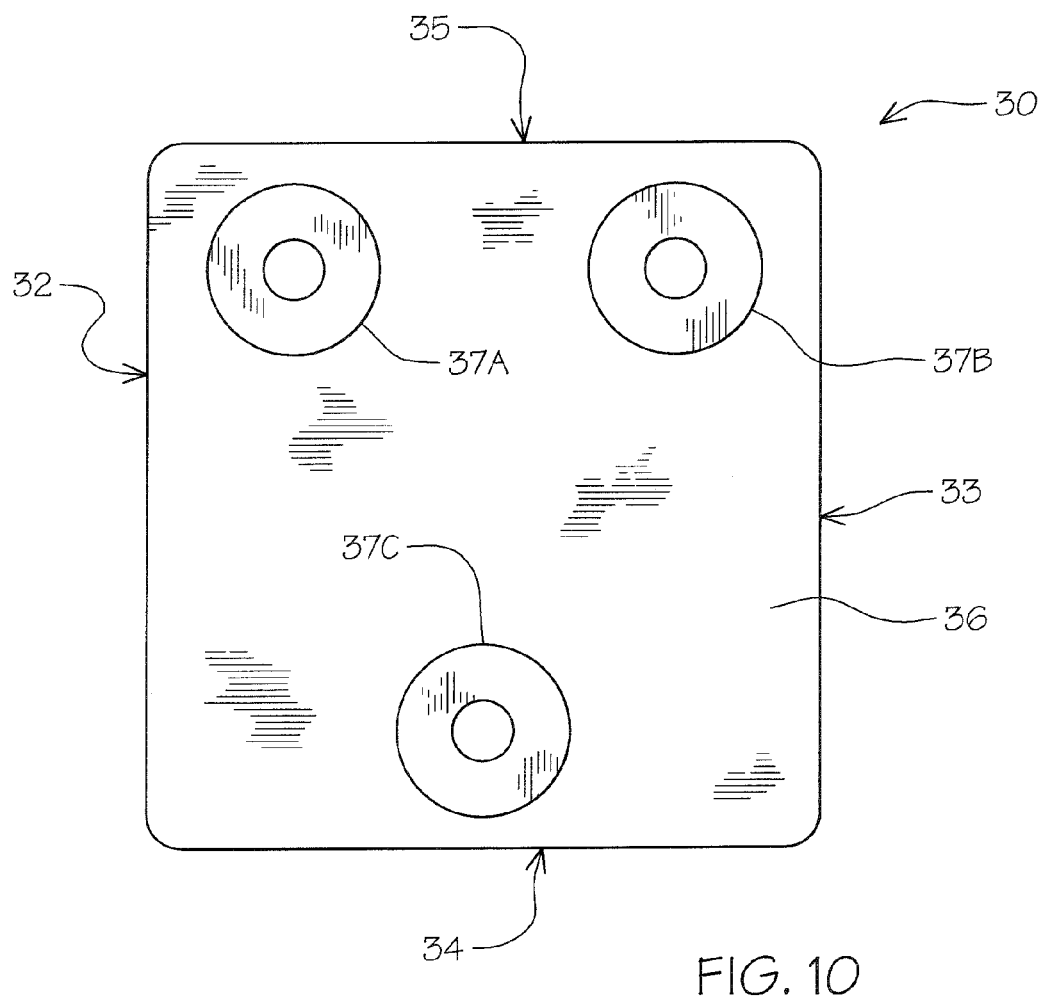
FIG. 10 is a top plan view thereof.

A second alternate form of the invention can be seen in FIGS. 9 and 10 of the drawings wherein a triple bolt receiving bumper spacer 30 is illustrated. The multiple bolt receiving bumper spacer 30 has a generally square main body member 31 with oppositely disposed parallel paired opposing side edges 32 and 33 and paired front and rear edges 34 and 35 defining a support bracket platform 36 configuration. A plurality of upstanding apertured lugs 37A, 37B and 37C extend from the support bracket platform in a triangular spaced pattern orientation with the lugs 37A and 37B spaced inwardly of the respective rear pair edges 35 which will provide bore alignment with the required mounting bolt protocol required in some vehicle bumper mounting assemblies, not shown.

It will be evident from the above description that multiple bumper spacer forms as noted are preferably made of metal for a durability and strength. Substitution of material of equal performance characteristics can be made and are well within the useful parameters of the disclosed invention utility.

It will be seen that by utilization of these multiple bumper spacer forms that a variety of different vehicle bumper applications can be addressed allowing for bumpers to be remounted in spaced relation to the vehicle's body member for additional clearance and custom application situations as described.

It will thus be seen that a new and useful bumper spacer system has been illustrated and described and it will be apparent to those skilled in the art that various changes and modification may be made thereto without departing from the spirit of the invention.

Therefore, I claim:

1. A bumper mounting spacer to reposition a vehicle bumper in relation to a vehicle body comprises, a monolithic spacer body, at least one bumper attachment bolt receiving bore extending centrally, longitudinally through said monolithic spacer body, a positioning tab extending from said monolithic spacer body for positioning and holding the monolithic spacer during alignment of the bumper attachment bolt, said positioning tab at a right angle to a longitudinal axis of the bumper attachment bolt receiving bore.

2. The bumper mounting spacer set forth in claim 1 wherein said monolithic spacer body has a top bumper effacing surface, and a spaced parallel bottom vehicle effacing surface.

3. The bumper mounting spacer set forth in claim 1 wherein said monolithic spacer body is cylindrical.

4. The bumper mounting spacer set forth in claim 1 wherein said monolithic spacer body is formed of metal.

5. The bumper mounting spacer set forth in claim 1 wherein said positioning tab has elongated flat opposing parallel side surfaces.

6. The bumper mounting spacer set forth in claim 1 wherein said positioning tab is of known length equal to the known length of said spacer body.

\* \* \* \* \*